(12) United States Patent
Costanza et al.

(10) Patent No.: US 11,338,481 B2
(45) Date of Patent: May 24, 2022

(54) METHOD OF MANUFACTURING A HYBRID INSULATING FRAME AND PANEL

(71) Applicant: KPS GLOBAL LLC, Fort Worth, TX (US)

(72) Inventors: James M. Costanza, Flower Mound, TX (US); Humberto Hernandez, North Richland Hills, TX (US); Brian L. Reiger, Fort Worth, TX (US); Brian W. Ausburn, Fort Worth, TX (US)

(73) Assignee: KPS GLOBAL LLC, Fort Worth, TX (US)

( * ) Notice: Subject to any disclaimer, the term of this patent is extended or adjusted under 35 U.S.C. 154(b) by 322 days.

(21) Appl. No.: 16/663,910

(22) Filed: Oct. 25, 2019

(65) Prior Publication Data
US 2020/0130240 A1   Apr. 30, 2020

Related U.S. Application Data

(60) Provisional application No. 62/751,325, filed on Oct. 26, 2018.

(51) Int. Cl.
*B29C 44/18* (2006.01)
*B29C 44/58* (2006.01)
*F25D 23/06* (2006.01)

(52) U.S. Cl.
CPC ............ *B29C 44/18* (2013.01); *B29C 44/58* (2013.01); *F25D 23/063* (2013.01); *B29K 2995/0015* (2013.01)

(58) Field of Classification Search
CPC ..... B29C 44/18; B29C 44/58; B29C 44/1228; B29C 44/1271; B29C 44/1276;
(Continued)

(56) References Cited

U.S. PATENT DOCUMENTS

| 8,522,500 | B1 | 9/2013 | Brown |
| 10,246,873 | B1 | 4/2019 | Costanza |

(Continued)

FOREIGN PATENT DOCUMENTS

| DE | 2035808 A1 | 1/1972 |
| WO | WO-2019/099909 A1 | 5/2019 |

OTHER PUBLICATIONS

International Application No. PCT/US2019/058028, International Search Report and Written Opinion, dated Feb. 20, 2020.

*Primary Examiner* — Jacob T Minskey
*Assistant Examiner* — S. Behrooz Ghorishi
(74) *Attorney, Agent, or Firm* — Marshall, Gerstein & Borun LLP (57) ABSTRACT

A method of manufacturing a hybrid insulating panel includes providing a mold of a frame, dispensing a first foam material in a liquid phase in the mold, and placing a beam in the mold. The method includes curing the first foam material to form an integrated frame, in which the integrated frame includes the beam at least partially surrounded by the first foam. Further, the method includes dispensing a second foam material into a panel cavity to form a panel body. The panel cavity is at least partially defined by a side of the integrated frame. The method includes curing the second foam material to form a panel body, wherein the panel body is secured to the integrated frame.

24 Claims, 6 Drawing Sheets

(58) Field of Classification Search
CPC ... B29C 44/128; B29C 44/1285; B29C 44/08; F25D 23/063; F25D 23/028; F25D 2323/024; B29K 2995/0015; B29K 2075/00; B29L 2007/002; B29L 2031/7622

See application file for complete search history.

(56) References Cited

U.S. PATENT DOCUMENTS

| | | | | |
|---|---|---|---|---|
| 2011/0120039 | A1* | 5/2011 | Minelli | B29C 44/0461 |
| | | | | 52/309.7 |
| 2014/0000203 | A1* | 1/2014 | Brown | F25D 23/06 |
| | | | | 52/404.4 |
| 2017/0101040 | A1* | 4/2017 | Shinohara | B60N 2/7017 |
| 2017/0136667 | A1* | 5/2017 | Kuroki | B60N 2/7017 |
| 2019/0145101 | A1 | 5/2019 | Costanza | |

* cited by examiner

METHOD OF MANUFACTURING A HYBRID INSULATING FRAME AND PANEL

CROSS-REFERENCE TO RELATED APPLICATION

This application claims the benefit under 35 U.S.C. § 119(e) of the filing date of U.S. Provisional Application No. 62/751,325, filed Oct. 26, 2018, the disclosure of which is hereby incorporated by reference in its entirety.

FIELD OF DISCLOSURE

The present disclosure generally relates to a method or process of manufacturing an insulating frame and panel, and more particularly, to a method or process of manufacturing a hybrid insulating panel and a hybrid insulating frame for a freezer or refrigerator wall or enclosure.

BACKGROUND

Freezers or refrigerated enclosures, such as refrigerated display cases and storage units, are typically constructed with a frame made of a material that either has high insulative properties or high structural reliability, but not both. For example, structurally reliable materials used for the frame, such as wood, steel, aluminum, have a low R value (i.e., thermal resistivity) and allow heat to enter the refrigerated enclosure through a frame joint (i.e., vertical joint between panels of the enclosure). In other examples, the frame is a high-density rail ("HDR") that is a better insulator, but often lacks structural integrity and reliability. A frame joint that is formed of HDR has a weaker structural performance than a wood frame joint, for example, and therefore has limited applications. Thus, an HDR frame is typically used in a freezer or refrigerated panel or enclosure for low load-bearing applications. In these applications, the structural performance of the panel or enclosure is traded for a higher thermal resistivity. That is, thermal resistivity (i.e., R value) will be optimized, but structural performance of the panel or enclosure would consequently be diminished. It follows that a wood frame is typically used in a freezer or refrigerated panel or enclosure for applications that require a high strength capacity.

SUMMARY

In accordance with a first exemplary aspect of the present disclosure, a method of manufacturing a hybrid insulating panel is provided. The method may include providing a mold of a frame and dispensing a first foam material in a liquid phase in the mold. The method may include placing a beam in the mold, and curing the first foam material to form an integrated frame. The integrated frame may include the beam at least partially surrounded by the first foam material. The method may further include dispensing a second foam material into a panel cavity to form a panel body. The panel cavity may be at least partially defined by a side of the integrated frame. The method may include curing the second foam material to form a panel body, wherein the panel body is secured to the integrated frame.

In accordance with a second exemplary aspect, a method of manufacturing a hybrid insulating frame is provided. The method may include providing a mold of a frame, and dispensing a foam in the mold in a liquid phase. The method may include placing a beam in the mold and curing the foam to form an integrated frame. The integrated frame may include the beam at least partially surrounded by the foam.

In further accordance with any one or more of the foregoing first and second exemplary aspects, a method of manufacturing a hybrid insulating panel and/or a hybrid insulating frame may include any one or more of the following further preferred forms.

In a preferred form, placing a beam in the mold may include placing the beam in the mold after dispensing the first foam material in the mold and while the first foam material is in the liquid phase.

In a preferred form, the method may include coating an interior side of the mold with a release agent before dispensing the first foam material in the mold.

In a preferred form, the method may include joining a first beam member with a second beam member. Placing the beam in the mold may include placing the joined first beam and second beam inside the mold.

In a preferred form, the method may include disposing a bracket against an interior side of the mold before dispensing the first foam material in the mold. The bracket may include a groove sized to receive a beam.

In a preferred form, placing the beam in the mold may include placing the beam within the groove of the bracket disposed in the mold.

In a preferred form, disposing the bracket may include disposing a plurality of brackets in the mold.

In a preferred form, dispensing the first foam material in the liquid phase in the mold may include distributing the first foam material along a length of the mold before curing the first foam material.

In a preferred form, the method may include forming the panel cavity by fastening a first metal sheet to a first side of the integrated frame and fastening a second metal sheet to a second side of the integrated frame. The second side may be opposite the first side of the integrated frame such that the panel cavity is defined by the interior side of the integrated frame, an interior side of the first metal sheet, and an interior side of the second metal sheet. The second foam material may adhere to the interior side of the first metal sheet, second metal sheet, and the integrated frame during curing.

In a preferred form, dispensing the second foam material may include injecting the second foam material into the panel cavity via a hole in the integrated sheet.

In a preferred form, the method may include forming a vent hole in the integrated frame before dispensing the second foam material into the panel cavity.

In a preferred form, forming the panel cavity may include fastening the first metal sheet to a first side of a second integrated frame and fastening the second metal sheet to a second side of the second integrated frame. The second side may be opposite the first side of the second integrated frame such that the panel cavity is further defined by an interior side of the second integrated frame.

In a preferred form, the method may include fastening the first metal sheet and the second metal sheet to a third integrated frame and a fourth integrated frame. The panel cavity may be further defined by an interior surface of the third integrated frame and an interior surface of the fourth integrated frame.

In a preferred form, the method may include shaping the integrated frame after curing the foam.

In a preferred form, the method may include molding the foam to form a female joint member. The female joint member may be at least partially compressible.

In a preferred form, the method may include molding the foam to form a male joint member. The male joint member may be at least partially compressible.

DETAILED DESCRIPTION

The present disclosure is generally directed to a method or process of manufacturing a hybrid insulating frame and a hybrid insulating panel having improved thermal performance, structural performance, energy performance, and life-cycle. A hybrid insulating panel manufactured according to a method or process disclosed herein may include one or more hybrid insulating frames; and a hybrid insulating frame manufactured according to the disclosed method or process integrates a structurally reliable core member with a highly insulative foam jacket. Therefore, the method or process of manufacturing a hybrid insulating frame of the present disclosure will be discussed, and with reference to FIGS. 1-4, before discussing the method or process of manufacturing a hybrid insulating panel of FIG. 5.

Figure 1:
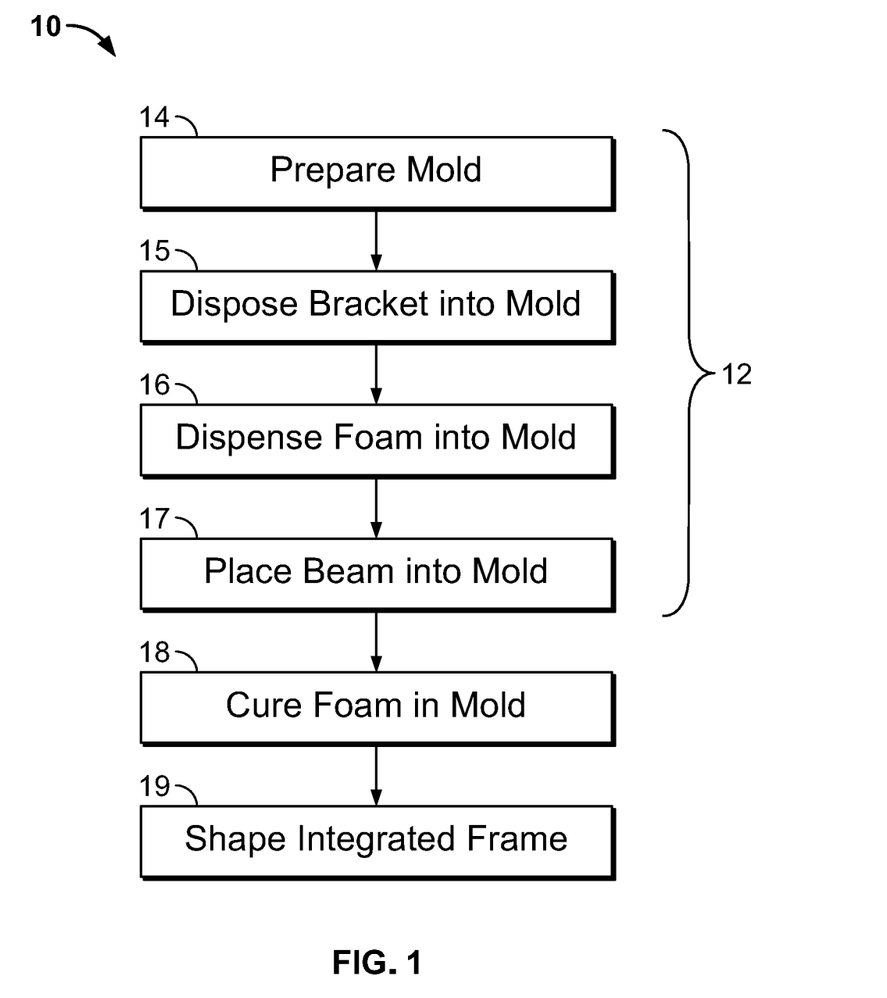
FIG. 1 is a schematic diagram of one method or process of manufacturing a hybrid insulating frame according to the teachings of the present disclosure.

FIG. 1 depicts a schematic diagram of an example method or process 10 of manufacturing a hybrid insulating frame. A hybrid insulating frame manufactured according to the method or process combines the structural performance of a wood or composite beam with the high thermal performance of foam insulation. As a result, the method or process 10 provides a hybrid insulating frame with a beam integrated with a foam jacket. The foam jacket is made of a foam material, and is shaped by a mold to form a compressible mating joint that seals with a corresponding mating joint of a different frame. The example method or process 10 of FIG. 1 may be followed to manufacture an insulating frame for insulating panels disclosed in U.S. patent application Ser. No. 15/967,675 filed May 1, 2018, U.S. patent application Ser. No. 15/814,732 filed Nov. 11, 2016, and U.S. Provisional Application No. 62/736,242 filed Sep. 25, 2018, the contents of which are hereby incorporated by reference in their entirety.

Generally speaking, the method or process 10 includes three main phases: an assembly phase 12, a curing phase 18, and a shaping phase 19. The assembly phase 12 of the example method or process 10 of FIG. 1 includes steps 14, 15, 16, and 17, and will be described in detail with reference to FIGS. 2-4. The curing phase 18 and the shaping phase 19 may include known methods and techniques for finishing an insulating frame so that the hybrid insulating frame is ready for use in the method or process of manufacturing a hybrid insulating panel for a refrigerated or freezer wall or enclosure.

Figure 2:
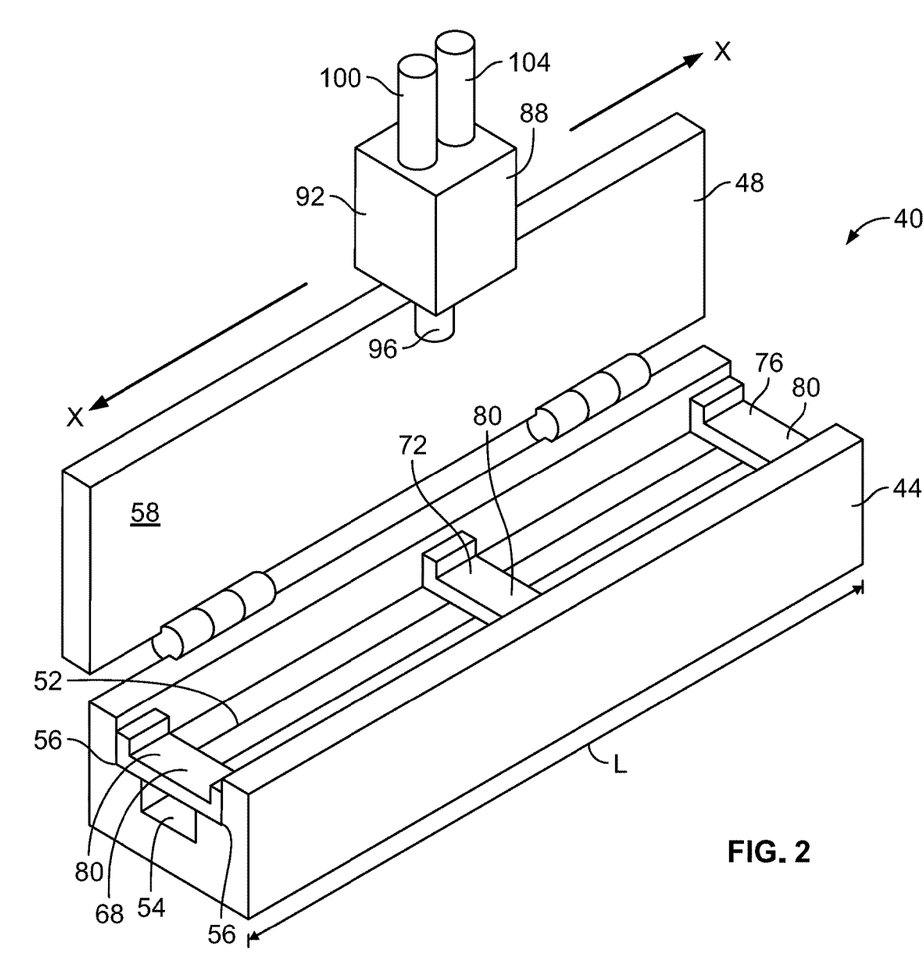
FIG. 2 illustrates an example method or process step of the method or process of FIG. 1, showing a mold for a hybrid insulating frame.

The assembly phase 12 initially includes a step 14 of providing and preparing a mold 40 of a frame (FIG. 2). The exemplary mold 40 of FIG. 2 includes a base 44 and hinged lid 48 configured to close against the base 44. The lid 48 remains in an open position during the assembly phase 12, and occupies a closed position to seal the lid 48 against the mold base 44 during the curing phase 18. The mold 40, which is partially illustrated in FIG. 2, may be stand-alone mold 40, or the mold 40 may be one of a plurality of molds in mass production process. For example, the method or process 10 of FIG. 1 may include providing a rotating carousel or other assembly line configuration having a plurality of molds 40 for manufacturing multiple hybrid insulating frames simultaneously. The mold 40 is made of aluminum, but can be any other suitable material, such as steel.

As shown in FIG. 2, the base 44 of the mold 40 includes a contoured interior side 52 shaped to form a mating joint of a hybrid insulating frame. The mating joint of the hybrid insulating frame may be molded into either a female mating joint (e.g., a groove) or a male mating joint (e.g., a tongue) for a female-male connection joint between two hybrid insulating frames. In the illustrated example, the contoured interior side 52 provides a groove 54 and stepped formation 56 on either side of the groove 54 to form a male mating joint (e.g., a tongue) having a protrusion. The stepped formation 56 of the base 44 of the mold 40 is shaped to form parallel sides of the hybrid insulating frame. The lid 48 has a flat interior side 58 to shape a flat back surface of the frame opposite the mating joint. The interior sides 52, 58 of the mold 40 may be coated with a release agent, such as wax, so that the foam material does not bond or adhere to the mold 40 during the curing phase 18. In other example molds 40, the interior side 52 of the base 44 of the mold 40 may be shaped to form a different male mating joint for a male frame, or a female mating joint for a female frame. In one example, the interior side 58 of the lid 48 may also be shaped differently to form a textured or contoured back side of the frame.

Optionally, the method or process 10 of FIG. 1 may include a step 15 of disposing one or more brackets 68, 72, 76 against the interior side 52 of the mold 40. As shown in FIG. 2, first, second, and third brackets 68, 72, and 76 are arranged in the base 44 of the mold 40 and are spaced apart along a length L of the mold 40. Each bracket 68, 72, 76 has a U-shaped body that spans across the groove 54 of the interior side 52 of the base 44 of the mold 40, and rests against the stepped formation 56. The brackets 68, 72, 76 are configured to hold a beam in place during the assembly and curing phases 12, 18, and permit the foam material to fill out the contours of the mold 40. A groove 80 of each bracket 68, 72, 76 faces away from the interior side 52 of the base 44, and is shaped and sized to receive a beam (FIG. 4) of the frame during the assembly phase 12. The brackets 68, 72, and 76 are pre-made and become encapsulated in the foam material with the beam during the curing phase 18. In this particular example, the brackets 68, 72, 76 are positioned within the mold 40 to achieve a particular orientation of the beam relative to the foam jacket of the hybrid insulating frame. However, in other examples, the brackets 68, 72, 76 may be configured to achieve a different beam and foam arrangement. While the brackets 68, 72, 76 if FIG. 2 are identical, in other examples, the brackets 68, 72, 76 may be different shapes and sizes to achieve a particular arrangement during the assembly and curing phases 12, 18 of the method or process 10. The brackets 68, 72, 76 may be a polyurethane of the same density as the foam material of the frame or may be another suitable material, such as plastic (e.g., PVC, ABS), to maintain its position and shape for holding the beam in place during each phase of the method or process 10.

Figure 3:
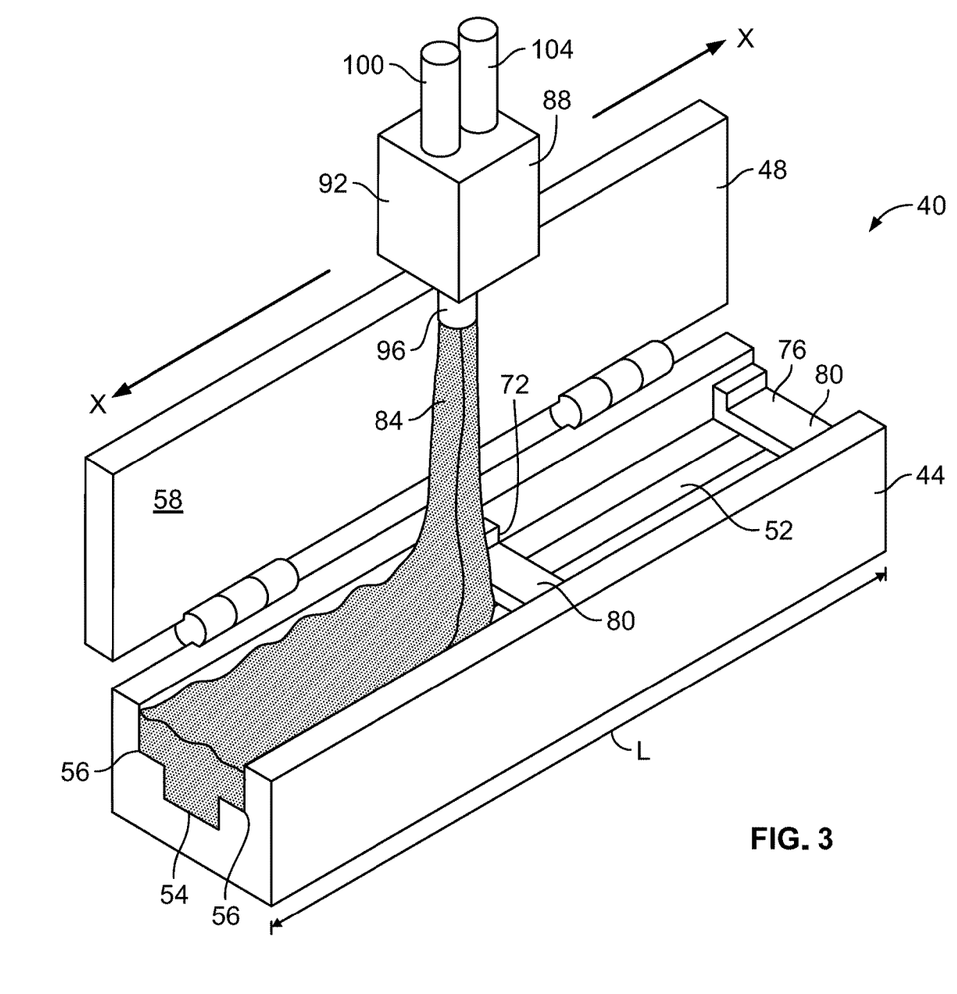
FIG. 3 illustrates an example method or process step of the method or process of FIG. 1, showing a foam material filling the mold of FIG. 2.

The assembly phase 12 of the method or process of FIG. 1 further includes a step 16 of dispensing a foam material 84 in a liquid phase into the mold 40 (FIG. 3). As shown in FIG. 3, this step 16 includes evenly distributing the foam material 84, which is in a liquid phase, along the length L of the mold 40 and over the brackets 68, 72, 76 disposed in the mold 40. A nozzle 88 suspended above the mold 40 is operated to dispense the foam material 84 while also moving (e.g., sliding) back and forth in a direction parallel to an X axis along the length L of the mold 40. The nozzle 88 includes a nozzle body 92 and a nozzle head 96 that dispenses the liquid foam material 84. The foam material 84 of the hybrid insulating frame may be, for example, polyurethane foam, such as ELASTOPOR P19080R, P18382R, P18380R, and may have a density in a range of approximately 3 lb./ft$^3$ to approximately 6 lb./ft$^3$. In one example, a dispensing machine (not shown) is operatively coupled to the nozzle 88 and is configured to pump the foam material 84 through the nozzle 88 and slide the nozzle 88 along the length L of the mold 40. The body 92 of the nozzle 88 is coupled to a first feed tube 100 and a second feed tube 104 to deliver the foam material 84 from a foam source through to the nozzle head 96. In this example, each feed tube 100, 104 may dispense a different component of the foam material 84 such that the components of the foam material 84 are kept separate, and therefore do not mix, until each component reaches the nozzle body 92. The two components of the foam material 84 may combine in the nozzle body 92, and then flow through the nozzle head 96 into the base 44 of the mold 40. The dispensing machine may be programmed to control the dispensing flow rate at the nozzle head 96 and/or at each of the first and second feed tubes 100, 104 to provide a particular composition of the foam material 84. For example, the dispensing machine may be programmed to dispense the foam material 84 through the nozzle head 96 at approximately 22.5 lb./minute. Additionally, the dispensing machine may be programmed to move the nozzle 88, either along a track or via an operating arm, at a constant or accelerated speed along the length L of the mold 40. In other examples, the foam delivery and the movement of the nozzle 88 may be operated by separately operating mechanisms, operators, and/or machinery.

Figure 4:
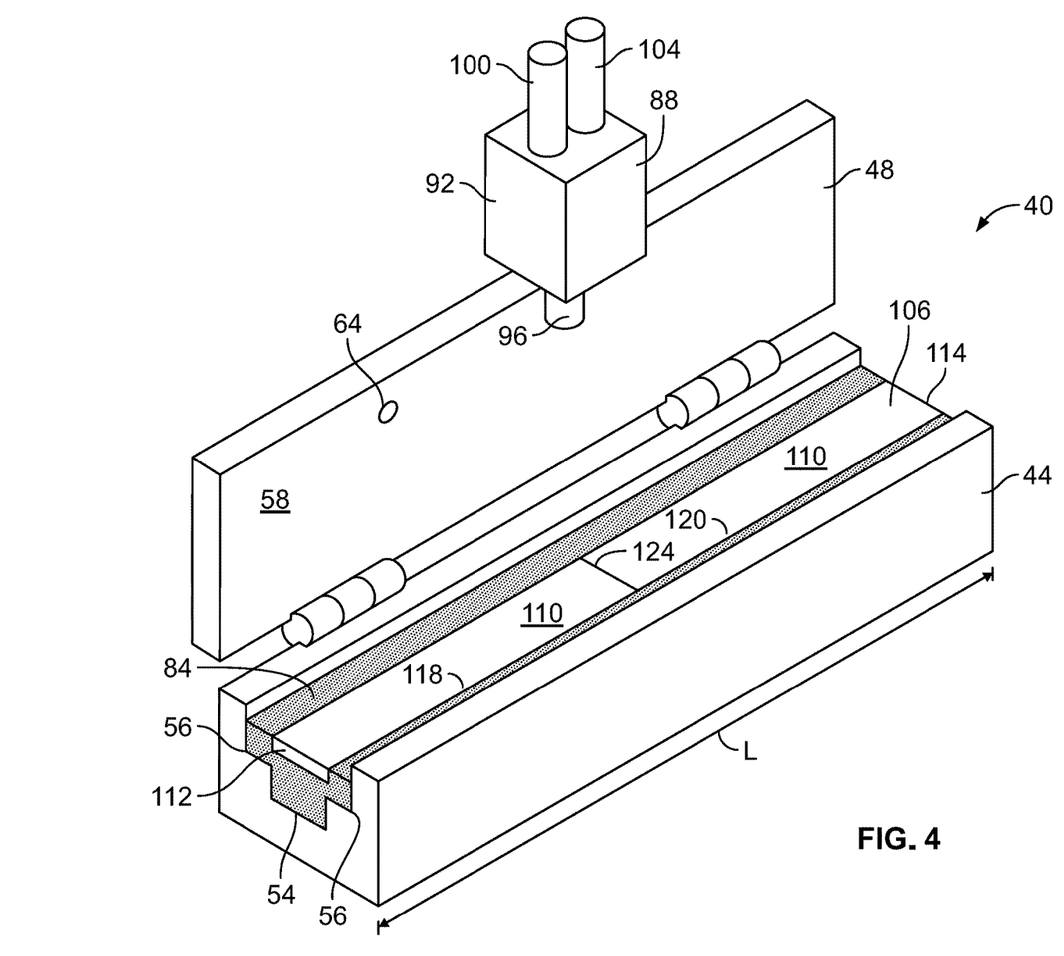
FIG. 4 illustrates an example method or process step of the method or process of FIG. 1, showing a beam placed into the mold of FIG. 2.

Finally, the assembly phase 12 of the method or process 10 of FIG. 1 further includes a step 17 of placing a beam 106 in the mold 40 (FIG. 4). To ensure the alignment and placement of the beam 106 in the mold 40, the beam 106 is placed within the grooves 80 of the brackets 68, 72, 76 disposed in the mold 40. The beam 106 is positioned such that an outer surface 110 and first and second ends 112, 114 of the beam 106 are exposed to the environment (i.e., not contacting the foam material 84), while the other sides of the beam 106 are in contact with the foam material 84. Once the beam 106 is in place in the mold 40 and at least partially surrounded by the foam material 84, the lid 48 of the mold 40 closes and the assembly is allowed to cure. The outer surface 110 of the beam 106 contacts the interior side 58 of the lid 48 when the lid 48 is in the closed position during the curing phase 18. Accordingly, the outer surface 110 of the beam 106 forms part of a back surface of a finished hybrid insulating frame.

The step 17 of the method or process 10 may optionally include preparing the beam 106 prior to placing the beam 106 into the mold 40. In the illustrated example, the beam 106 includes a first beam member 118 and a second beam member 120 that are joined at a seam 124 (e.g., via fasteners, adhesive, welding). In this way, the hybrid insulating frame may be manufactured with one or more beam members 118, 120 to provide a particular frame length. As such, the length of the hybrid insulating frame is not limited to the length of a single beam member 118, 120. The beam 106 may be plywood, lumber, magnesium oxide, gypsum, rigid plastic, fiberglass, carbon fiber, Kevlar, fiberglass reinforced plastic resin, or other rigid material.

The method or process 10 depicted in FIG. 1 and exemplary steps shown in FIGS. 2-4 are exemplary, and may be followed to manufacture hybrid insulating frames of varying dimensions, material compositions, beam and jacket arrangements, and geometry. In one example, the beam 106 may be prepared in a separate curing process such that the beam 106 has a hollow interior cavity filled with an insulating foam material before the beam 106 is placed in the mold 40. In another example, the step 16 of dispensing the foam 84 into the mold 40 and the step 17 of placing the beam 106 into the mold 40 may be reversed such the beam 106 may be placed against the brackets 80 in the mold 40 before dispensing the foam material 84. This arrangement of method or process steps may be better suited for a hybrid insulating frame in which the beam 106 is completely embedded within the foam material 84. Additionally, the assembly phase 12 may include incorporating other components into the mold for seamless integration into the hybrid insulating frame. For example, a radiofrequency identification (RFID) tag may be embedded in the foam material 84 for tracking and/or identification purposes of the manufactured hybrid insulating frame. Other components, such as lighting devices, sensors, or other electronics, may be embedded into the hybrid insulating frame during the assembly phase 18, or incorporated later into the shaping phase 19.

The method or process 10 of FIG. 1 further includes the curing phase 18 in which the beam 106 is integrated with the foam 84 to form an integrated hybrid insulating frame. The lid 48 of the mold 40 is closed and remains closed throughout the curing phase 18. The insulating foam 84 of the frame may be set to cure at a particular temperature, such as, for example, 90 to 105 degrees Fahrenheit, and/or for a particular duration, for example, 30 to 45 minutes. As the foam material 84 cures within the mold 40, the foam material 84 adheres to beam 106. After the curing process 18 is completed, a bond is formed between the foam jacket and the beam 106, forming an integrated hybrid frame. After curing 18, a foam joint member is molded and the beam 106 is at least partially surrounded by the foam 84. The curing time and temperature for curing can vary depending on a number of variables, including foam composition, environmental conditions, etc.

Finally, the method or process of 10 FIG. 1 includes the shaping phase 19 to modify the hybrid insulating frame into a final desired shape and form. The shaping phase 19 may include cutting, shaving, polishing, smoothing, buffing, and/or other finalizing steps to prepare the hybrid insulating frame for use in the method or process of manufacturing a hybrid insulating panel, discussed below. The shaping phase 19 may include forming a slot and installing a locking mechanism, such as a cam-lock, into the formed slot of the frame. For example, a receiving pin may be installed into a groove of the mating joint of a female frame, and a cam lock may be installed into a protrusion of the mating joint of a male frame. Other steps in the shaping phase 19 include providing a gasket, applying labels, and/or installing electrical components. Additionally, the hybrid insulating frame is not limited to the length of the mold, and may be cut to a desired size. For example, the mold may be a particular dimension that is easily divisible into multiple, standard size frames to reduce waste.

Figure 5:
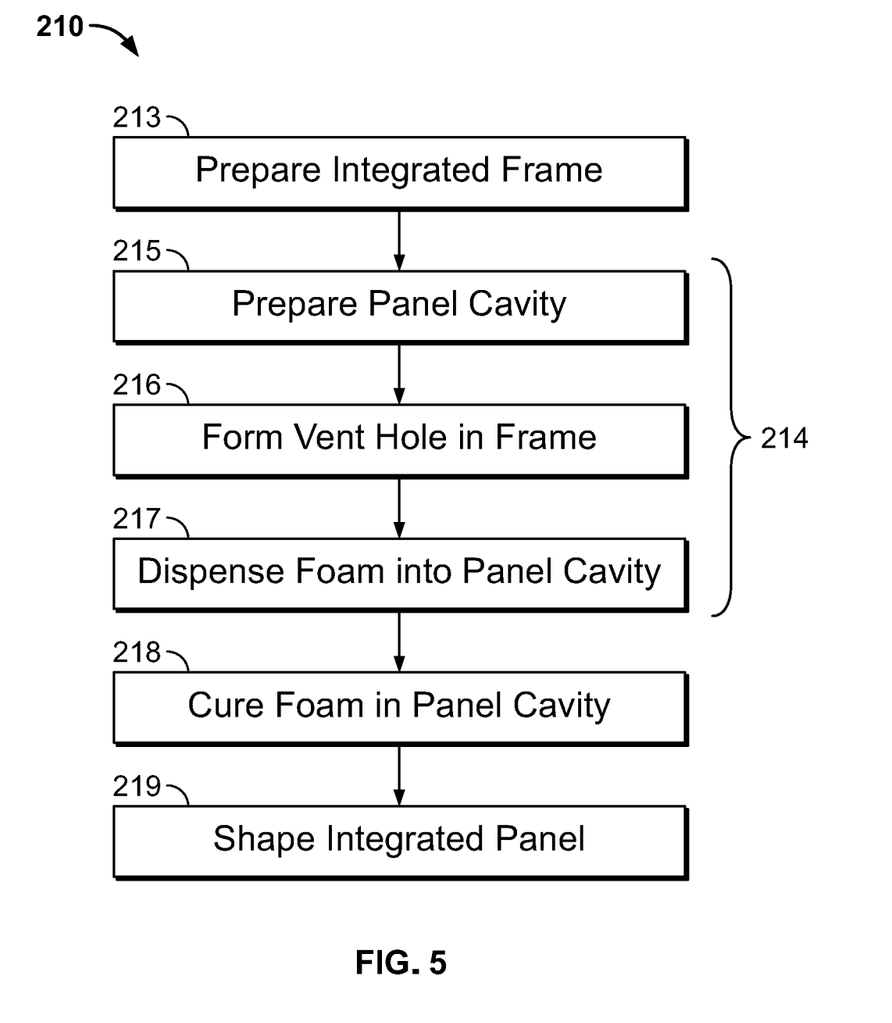
FIG. 5 is a schematic diagram of one method or process of manufacturing a hybrid insulating panel according to the teachings of the present disclosure.

Turning now to FIG. 5, an example method or process 210 or process of manufacturing a hybrid insulating panel is depicted in a schematic diagram. Generally speaking, the method or process 210 of FIG. 5 includes four main phases: a frame manufacturing phase 213, an assembly phase 214, a curing phase 218, and a shaping phase 219. The frame manufacturing phase 213 includes the method or process 10 of manufacturing a hybrid insulating frame, such as the method or process 10 described above with references to FIGS. 1-4. The frame manufacturing phase 213 may be performed up to four times to provide four separate hybrid insulating frames (i.e., one hybrid insulating frame per side of a rectangular hybrid insulating panel). The method or process 210 involves a separate curing phase 218 from the curing phase 18 of the method or process 10 of FIG. 1, and results in a foam panel body of the hybrid insulating panel. As discussed below, a step of dispensing a foam material into a panel cavity, which is at least partially defined by a plurality of finished hybrid insulating frames, forms the foam panel body of the hybrid insulating panel.

Figure 6:
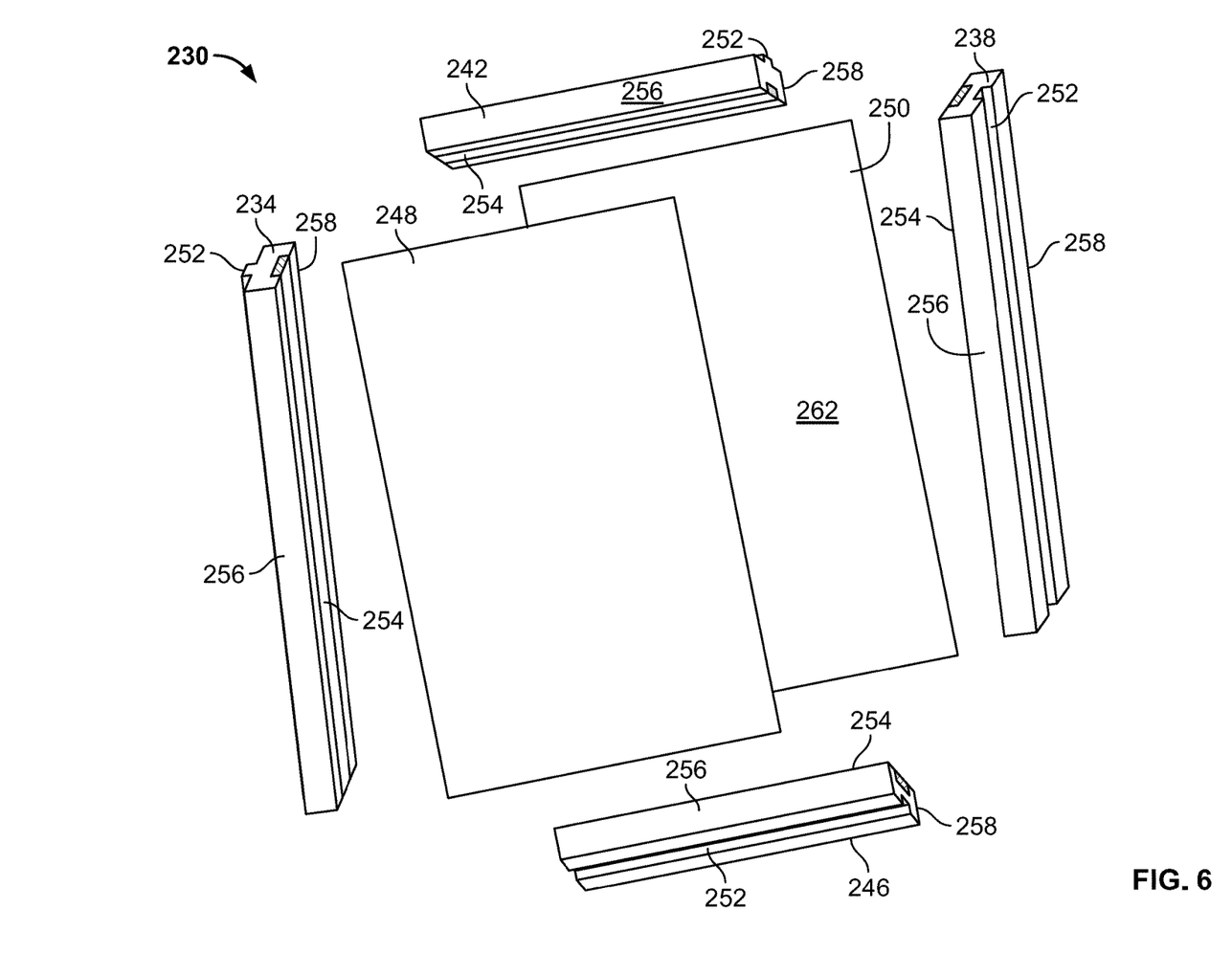
FIG. 6 illustrates an example method or process step of the method or process of FIG. 5, showing an exploded panel assembly.

The assembly phase 214 of the method or process 210 of FIG. 5 includes a step 215 of preparing a panel cavity for molding the foam panel body of a hybrid insulating panel (FIG. 6) and a step 216 of forming one or more vent holes in each frame. FIG. 6 illustrates an exploded view of a hollow panel assembly 230. The step 215 of preparing the panel cavity includes first assembling the skeletal components of the hollow panel 230; this includes providing first and second vertical frames 234, 238, first and second horizontal frames 242, 246, a first metal sheet 248, and a second metal sheet 250. The step 215 of preparing the panel cavity includes first securing the first and second vertical frames 234, 238 and the first and second horizontal frames 242, 246 together to form a rectangular main frame. Each frame 234, 238, 242, 246 will provide an interior wall of the panel cavity and a mating joint 252 (e.g., male or female) of the panel 230. In particular, a back surface 254 of each hybrid insulating frame 234, 238, 242, 246 (i.e., the surface facing the lid 48 of the mold 40 in FIG. 4) together define an interior perimeter of the panel cavity.

The assembly phase 214 further includes the step 216 of forming one or more vent holes in each frame when the panel cavity is assembled. The vent holes permit air contained in a panel cavity to vent to the atmosphere during the assembly and curing phases 214, 218. In this way, any trapped air in the panel cavity can vent, facilitating the flow of the foam material to fill the entire volume of the panel cavity to form the foam panel body. The presence of vent holes during the assembly and curing phases 214, 218 may prevent abnormalities and voids from forming in the foam panel body of the hybrid insulating panel. In another example method, the step 216 of forming vent holes in the frame may be performed before the step 215 of preparing the panel cavity.

As shown in FIG. 6, the first vertical frame 234 and the first horizontal frame 242 are male frames and each provides a protrusion joint member 252, whereas the second vertical frame 238 and the second horizontal frame 246 are female frames and each provides a groove 252 configured to mate with a protrusion of a male frame. The joint member 252 of each frame 234, 238, 242, 246 is compressible such that the male joint member 252 and the female joint member 252 are shaped to form a seal between two frames of different panels. Further, each frame 234, 238, 242, 246 includes generally flat, parallel first and second sides 256, 258 (i.e., formed by the stepped formation 56 of the mold 40 in FIGS. 2-4). The first and second sides 256, 258 of each frame 234, 238, 242, 246 are perpendicular to the back surface 254 and extend between the back surface 254 and the joint member 252 of each frame 234, 238, 242, 246. In this example, the frames 234, 238, 242, 246 are hybrid insulating frames that are manufactured following the method or process 10 of FIG. 1. However, in other examples, one or more of the frames 234, 238, 242, 246 of the hybrid insulating panel may be manufactured separately and/or by another method or process. Additionally, the method or process 210 of manufacturing a hybrid insulating panel may include assembling any combination of male and female frames.

Once the frames 234, 238, 242, 246 are secured in a rectangular main frame configuration, the step 215 of preparing the panel cavity further includes fastening the first metal 248 sheet and the second metal sheet 250 to each of the first and second vertical frames 234, 238 and the first and second horizontal frames 242, 246. One sheet 248, 250 is fastened to the main frame at a time. For example, the first metal sheet 248 is fastened to the first side 256 of each of the first vertical frame 234, second vertical frame 238, first horizontal frame 242, and second horizontal frame 246 before fastening the second metal sheet 250 to the second side 258 (opposite the first side 256) of each of the first vertical frame 234, second vertical frame 238, first horizontal frame 242, and second horizontal frame 246. After fastening both sheets 248, 250 to the main frame, the panel cavity is enclosed and defined by the back surface 254 of each of the first and second vertical hybrid insulating frames 234, 238, the first and second horizontal hybrid insulating frames 242, 246, an interior side (hidden in FIG. 6) of the first metal sheet 248, and an interior side 262 of the second metal sheet 250. The metal sheets 248, 250 are fastened (via one or more fasteners) to the main frame in parallel. In this way, the metal sheets 248, 250 of the hollow panel assembly 230 help shape the foam panel body during the assembly and curing phases 214, 218, and provide smooth and parallel protective surfaces to the finished hybrid insulating panel.

Once the hollow panel assembly 230 is assembled such that the panel cavity is enclosed, the assembly phase 214 further includes a step of preparing the panel cavity for receiving the insulating foam material. This step may include drilling the hollow panel 230 with one or more holes in one or more of the hybrid insulating frames 234, 238, 242, 246. The holes may be a first, larger size to provide a port (i.e., a shot hole) for dispensing the foam material into the panel cavity, and a second, smaller size for permitting air to vent during the assembly and curing phases 214, 218. The hollow panel assembly 230 may be disposed into a press to ensure final dimensions of the hybrid insulating panel, and a step 217 of dispensing the foam material into the panel cavity is performed while the panel assembly 230 is in the press. The foam material of the panel body may be a second foam material that is different in foam composition and/or density than a first foam material 84 of the hybrid insulating frames. The second foam material is injected through one or more ports formed in the hollow frame assembly 230. In some examples, the second foam material of the panel body of the hybrid insulating panel may also be polyurethane foam, such as ELASTOPOR P19080R, P18382R, P18380R, however, the second foam material of the panel body has a density of approximately 2.2 lb./ft³. After the panel cavity is filled with the foam material, the hybrid insulating panel is removed from the press and allowed to cure.

The method or process of FIG. 5 further includes the step 218 of curing the foam material in the panel cavity to form the foam panel body. As the foam cures within the panel cavity, the foam material adheres to the interior side of the first metal sheet 248, the interior side 262 of the second metal sheet 250, and the back surface 254 of each of the hybrid insulating frames 234, 238, 242, 246. After the curing process 218 is completed, a bond is formed between the foam panel body and the metal sheets 248, 250, and between the foam panel body and the back surfaces 254 of the hybrid insulating frames 234, 238, 242, 246. In this way, the hybrid insulating frames 234, 238, 242, 246 are secured to the foam panel body. Finally, the shaping phase 219 may include cutting, shaving, polishing, smoothing, buffing, and/or other finalizing steps to prepare the hybrid insulating panel assembling into a refrigerated or freezer enclosure. Additionally, the shaping phase 219 may include providing a gasket, applying labels, and/or installing electrical components.

The figures and description provided herein depict and describe preferred examples of a method or process 10, 210 of manufacturing a hybrid insulating frame and/or hybrid insulating panel of a freezer or refrigerated enclosure for purposes of illustration only. One skilled in the art will readily recognize from the foregoing discussion that alternative examples of the components illustrated herein may be employed without departing from the principles described herein. Thus, upon reading this disclosure, those of skill in the art will appreciate still additional alternative steps and structural and functional designs for hybrid insulating frames and panels that achieve both structural and thermal reliability. Therefore, while particular examples and applications have been illustrated and described, it is to be understood that the disclosed examples are not limited to the precise construction, method steps, and components disclosed herein. Various modifications, changes and variations, which will be apparent to those skilled in the art, may be made in the arrangement, operation and details of the methods and components disclosed herein without departing from the spirit and scope defined in the appended claims.

What is claimed:

1. A method of manufacturing a hybrid insulating panel, the method comprising:
   providing a mold of a frame;
   dispensing a first foam material in a liquid phase in the mold;
   disposing a bracket against an interior side of the mold;
   placing a beam in the mold, the bracket including a groove sized to receive the beam;
   curing the first foam material to form an integrated frame, the integrated frame including the beam at least partially surrounded by the first foam material;
   dispensing a second foam material into a panel cavity, the panel cavity at least partially defined by a side of the integrated frame; and
   curing the second foam material to form a panel body, wherein the panel body is secured to the integrated frame.

2. The method of claim 1, wherein placing the beam in the mold includes placing the beam in the mold after dispensing the first foam material in the mold and while the first foam material is in the liquid phase.

3. The method of claim 1, further comprising coating an interior side of the mold with a release agent before dispensing the first foam material in the mold.

4. The method of claim 1, further comprising joining a first beam member with a second beam member and wherein placing the beam in the mold includes placing the joined first beam member and second beam member inside the mold.

5. The method of claim 1, wherein disposing the bracket includes disposing the bracket before dispensing the first foam material in the mold.

6. The method of claim 1, wherein placing the beam in the mold includes placing the beam within the groove of the bracket disposed in the mold.

7. The method of claim 1, wherein disposing the bracket includes disposing a plurality of brackets in the mold.

8. The method of claim 1, wherein dispensing the first foam material in the liquid phase in the mold includes distributing the first foam material along a length of the mold before curing the first foam material.

9. The method of claim 1, further comprising:
   forming the panel cavity by fastening a first metal sheet to a first side of the integrated frame and fastening a second metal sheet to a second side of the integrated frame, the second side opposite the first side of the integrated frame such that the panel cavity is defined by the interior side of the integrated frame, an interior side of the first metal sheet, and an interior side of the second metal sheet, wherein the second foam material adheres to the interior side of the first metal sheet, second metal sheet, and the integrated frame during curing.

10. The method of claim 9, wherein dispensing the second foam material includes injecting the second foam material into the panel cavity via a hole in the integrated frame.

11. The method of claim 9, further comprising forming a vent hole in the integrated frame before dispensing the second foam material into the panel cavity.

12. The method of claim 9, wherein forming the panel cavity further includes fastening the first metal sheet to a first side of a second integrated frame and fastening the second metal sheet to a second side of the second integrated frame, the second side opposite the first side of the second integrated frame such that the panel cavity is further defined by an interior side of the second integrated frame.

13. The method of claim 12, further comprising fastening the first metal sheet and the second metal sheet to a third integrated frame and a fourth integrated frame, wherein the panel cavity is further defined by an interior surface of the third integrated frame and an interior surface of the fourth integrated frame.

14. A method of manufacturing a hybrid insulating frame, the method comprising:
   providing a mold of a frame;
   disposing a bracket against an interior side of the mold;
   dispensing a foam in the mold in a liquid phase;
   placing a beam in the mold, the bracket including a groove sized to receive the beam; and
   curing the foam to form an integrated frame, the integrated frame including the beam at least partially surrounded by the foam.

15. The method of claim 14, wherein placing the beam in the mold includes placing the beam in the mold after dispensing the foam in the mold and while the foam is in the liquid phase.

16. The method of claim 14, further comprising coating an interior side of the mold with a release agent before dispensing the foam in the mold.

17. The method of claim 14, further comprising joining a first beam member with a second beam member and wherein placing the beam in the mold includes placing the joined first beam member and second beam member inside the mold.

18. The method of claim 14, wherein disposing the bracket includes disposing the bracket before dispensing the foam in the mold.

19. The method of claim 14, wherein placing the beam in the mold includes placing the beam within the groove of the bracket disposed in the mold.

20. The method of claim 14, wherein disposing the bracket includes disposing a plurality of brackets in the mold.

21. The method of claim 14, wherein dispensing the foam in the liquid phase in the mold includes distributing the foam along a length of the mold before curing the foam.

22. The method of claim 14, further comprising shaping the integrated frame after curing the foam.

23. The method of claim 14, further comprising molding the foam to form a female joint member, the female joint member being at least partially compressible.

24. The method of claim 14, further comprising molding the foam to form a male joint member, the male joint member being at least partially compressible.

* * * * *